United States Patent Office 2,999,414
Patented Sept. 12, 1961

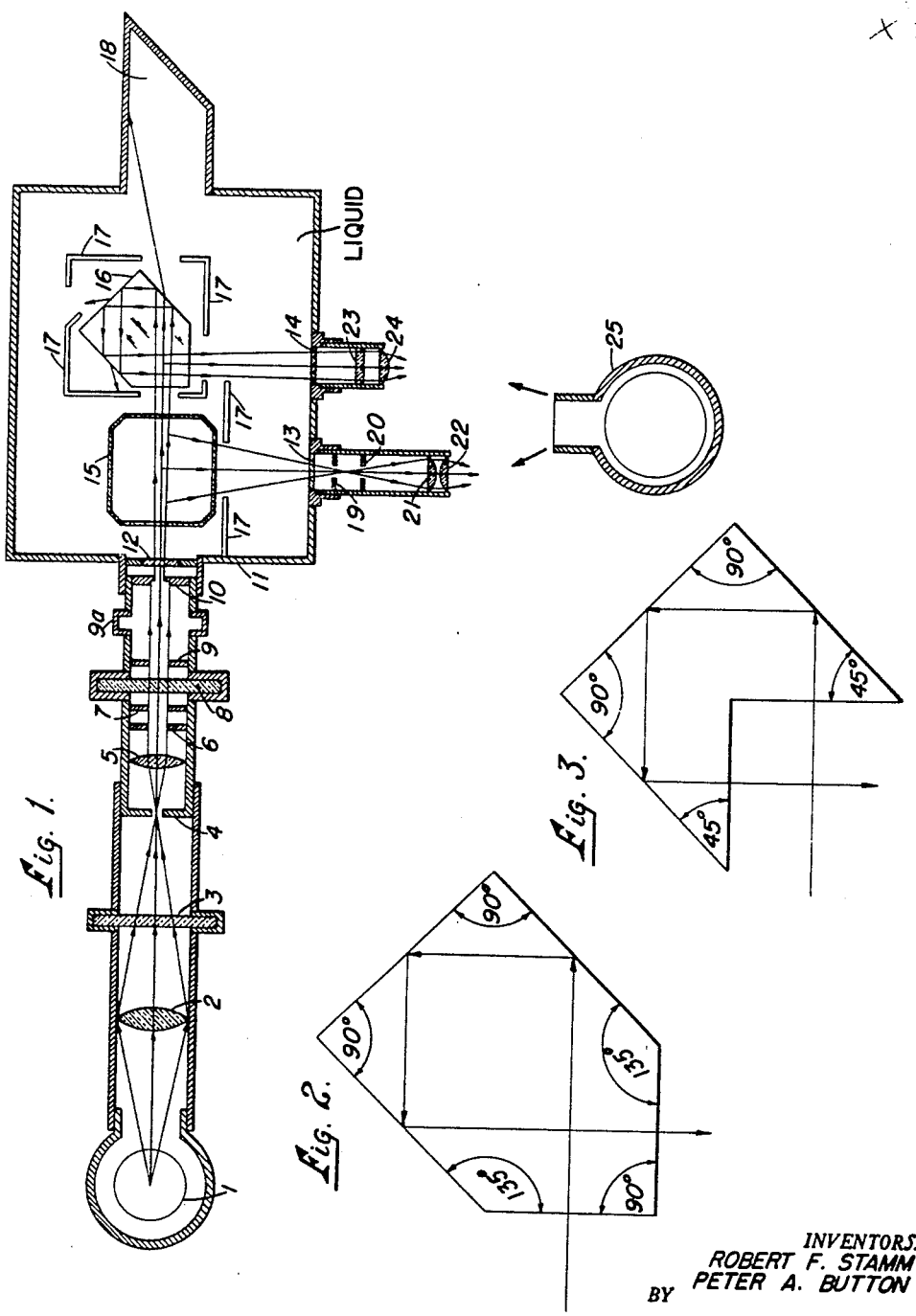

2,999,414
LIGHT BEAM WEAKENER
Robert F. Stamm, Stamford, Conn., and Peter A. Button, Eau Gallie, Fla., assignors to American Cyanamid Company, New York, N.Y., a corporation of Maine
Filed June 17, 1958, Ser. No. 742,550
3 Claims. (Cl. 88—1)

This invention relates to a light beam weakener, or attenuator, for reducing the intensity of a light beam by a calculatable large amount.

This application is a continuation-in-part of our co-pending application Serial No. 440,364 filed June 30, 1954, entitled, "Device for the Measurement of Absolute Turbidity," now Patent 2,858,727, dated November 4, 1958.

It has become an increasing interest to be able to decrease the strength of a beam of light by a factor of 100 to 1,000,000 or more, to use the weakened beam in light scattering measurements or other optical devices.

The theory of scattering of light by solutions is utilized in evaluating weight-average molecular weights according to the turbidimetric method of Debye [J. Phys. Colloid Chem. 51, 18 (1947)]. The turbidity due to concentration fluctuations is related to the molecular weight according to the equation:

$$Hc/\tau^2 = \frac{1}{M} + 2Bc$$

where $$H = \frac{32\pi^3}{3\lambda^4 N_0} n_0^2 \left(\frac{\Delta n}{\Delta c}\right)^2$$

$\lambda$=Wave length of radiation employed
$N_0$=Avogardro's number
$n_0$=Refractive index of solvent $\frac{\Delta n}{\Delta c}$=Refractive index gradient with concentration $c$=Concentration in grams/cc.
$\tau_2$=Turbidity due to concentration fluctuations
$M$=Weight-average molecular weight
$B$=A constant Since the determination of the molecular weight is directly related to the turbidity due to concentration fluctuations, and since these values may be measured directly or by comparison with a turbidimetric standard, it is highly important that the value of the standard be free from error or otherwise the molecular weight determination is also erroneous.

The present beam weakener may be used to weaken a light beam to be used as a reference standard in such a turbidimeter or other device.

FIGURE 1 of the accompanying drawings is a section plan view of the improved device;

FIGURE 2 is a view in cross-section of a novel beam weakener employed with the device shown in FIGURE 1; and FIGURE 3 is a view of a modification thereof.

Referring to FIGURE 1 of the drawings, light originating in mercury arc source 1 is collected by means of lens 2 and passes through filter 3 which removes some of the unwanted radiation, and is focused on the square slit 4. Square slit 4 is at the focal point of lens 5 so as to send parallel light through circular diaphragms 6, 7 and 9 and interference filter 8. A suitable polarizer at 9a not shown may be interposed in the path of the parallel light beam just beyond filter 8. The radiation passes through square diaphragm 10 and enters water tank 11 which is provided with three apertures 12, 13 and 14 provided with clear glass windows. The radiation passes through aperture 12 and through cell 15 which contains the sample of liquid, the turbidity of which is to be measured. Cell 15 is conveniently a glass container provided with flat surfaces as indicated so as to permit the undeviated passage of light therethrough. The incident beam passes through the cell and through the sample of liquid where it strikes the solid glass prism or beam weakener 16. The incident beam enters the beam weakener normal to the first surface and is attenuated in intensity by three successive reflections from liquid-glass interfaces at known angles of incidence which in this case are 45°. The reflection and transmission coefficients at these interfaces will depend upon the indices of liquid and glass and upon the angle of incidence. The actual numerical values can be calculated from Fresnel's equations. The liquid employed must be one whose refractive index will remain stable with time. Suitable baffles 17 are provided to eliminate sources of stray light. As is apparent, a portion of the incident beam passes through the beam weakener and enters the light trap 18. The attenuated incident beam passes from beam weakener 16 through aperture 14. The scattered radiation passes through aperture 13. Suitable rectangular diaphragms 19 and 20 are provided adjacent to the outer surface of aperture 13. Also positioned in proximity to diaphragms 19 and 20 are suitable plano-convex lenses 21 and 22, and adjacent to aperture 14 is a plano-cylindrical lens 23 and a plano-convex lens 24 which collect all of the radiation from the glass beam weakener.

The purpose of lenses 21, 22, 23, and 24 is to focus the scattered and incident beams on any sensitive light detecting device such as the cathode of a multiplier phototube (which may be a type 1P21 or 931-A made for example by RCA) positioned within housing 25 so as to make both scattered and incident beam images the same size and to bring both of them to the same position on the cathode. It has been found that some light detecting devices will measure intensity ratios correctly only under these conditions; with others, the precautions are not necessary. As is apparent, the photomultiplier tube may be shifted from apertures 13 and 14 as desired in order to measure successively the scattered radiation and the incident radiation which has been attenuated a known amount by the action of the beam weakener.

In practice, it has been found that good results in particular are secured by the use of an end-on multiplier phototube, for example, Dumont type 6291. When such a phototube is employed, lenses 21, 22, 23, and 24 may be omitted provided the illuminated area of the cathode is substantially the same in the two beams.

The novel beam weakener is shown more in detail in FIGURES 2 and 3. FIGURE 2 represents beam weakener 16 as used in the device of FIGURE 1 and FIGURE 3 represents a modification thereof with part of the prism cut away.

The beam weakeners are made of colorless, optical-quality glass free from bubbles and inclusions. The sides are all surface polished flat to within one-quarter of wave length of 5461 A units. All angles are ±5' of arc. The obtuse angles of the beam weakener shown in FIGURE 2 are 135°, the remaining angles being, of course, 90°. The acute angles of the beam weakener shown in FIGURE 3 are 45° and the remaining angles 90°.

Both of the described beam weakeners have been found in actual practice to provide a simple way of weakening a beam of light by a factor of the order of $5 \times 10^{-6}$ and of a known amount.

Although the invention has been more particularly described in connection with beam weakeners which produce multiple reflections, it is also within the scope of the present invention to use a glass prism which produces only a single reflection at the liquid-glass interface. For example, an ordinary glass prism having two angles of 45° and one of 90° immersed in a liquid whose refractive index nearly matches that of the glass in the wave length desired may be used. Such a combination would achieve a weakened beam with only one reflection. However, since it is difficult to find a liquid having the desired optical properties and one which is stable with time, non-hygroscopic and inert toward all of the elements inside the liquid bath, it is preferred to use the prisms shown in FIGURES 2 and 3, each of which involve multiple reflections, and in the cases cited, involve specifically three reflections.

In obtaining a value for turbidity or 90° scattering power from the experimental values of relative intensities of scattered beam and reference beam measured by the present device, it is necessary to employ certain mathematical and arithmetical calculations which while forming no part of the present invention must be taken into consideration.

These calculations involve the sizes and separation of the apertures 19 and 20, the transmission coefficients of the lenses 21—24, inclusive, the reflectivity of the beam weakener, the correction for the extra light in the reference beam attributable to scattering from glass or water, the refractive indices of the various media involved, the geometrical distance from the center of the scattering cell to aperture 19, the preferential response of the phototube to verically- and horizonally-polarized light, and (if here is such a preference) the depolarization ratio of the light scattered by the liquid. All of these factors must be taken into account in interpreting the results obtained with the present device. However, they have no direct bearing on the apparatus of the present invention as such.

The beam weakener can be used also in the calibration of a spectrophotometer, or of spectrophotometers, or any other device where a beam weakened by a known amount is of value in measurement or control.

We claim:

1. A light beam weakener for weakening a light beam by a factor of the order of $5 \times 10^{-6}$ comprising a liquid bath, a seven-sided one-piece glass prism immersed in said liquid bath, said prism having five flat working surfaces, the second and fourth of which surfaces are parallel, a third surface at right angles to the second and fourth surfaces, said second, third, and fourth surfaces comprising glass-liquid reflecting surfaces, and a first and fifth light transmitting surface, which surfaces when extended form an angle of 45° with said third surface and which are at 90° with each other, all of said surfaces being perpendicular to a common plane, and a light source impinging incident substantially parallel light on said first light transmitting surface of the prism; said liquid bath having a different index of refraction than said glass prism at the wave length being employed, thereby causing the major portion of the light to escape from the prism at each reflection and a small but calculable portion of the light beam to be internally reflected from each surface.

2. A beam weakener according to claim 1 in which the prism comprises a flat-surfaced, seven-sided solid glass prism having two obtuse angles of 135°, the remaining angles being 90°, and the light is reflected internally of the prism three times from glass-liquid interfaces.

3. A beam weakener according to claim 1 in which the prism comprises a flat-surfaced, seven-sided solid glass prism having two acute angles of 45°, the remaining angles being 90°, and the light is reflected internally of the prism three times from glass-liquid interfaces.

References Cited in the file of this patent

UNITED STATES PATENTS

| | | |
|---|---|---|
| 621,283 | Pulfrich | Mar. 14, 1899 |
| 869,769 | Bell | Oct. 29, 1907 |
| 1,277,040 | Brewster | Aug. 27, 1918 |
| 2,328,603 | Bennett et al. | Sept. 7, 1943 |
| 2,569,127 | Eltenton | Sept. 25, 1951 |

FOREIGN PATENTS

| | | |
|---|---|---|
| 476,360 | Germany | May 15, 1929 |